(12) United States Patent
Lin et al.

(10) Patent No.: US 10,037,113 B2
(45) Date of Patent: Jul. 31, 2018

(54) TOUCH DEVICE AND MANUFACTURING METHOD THEREOF

(71) Applicant: TPK Touch Solutions (Xiamen) Inc., Xiamen (CN)

(72) Inventors: Ching-Shan Lin, Tainan (TW); Cheng-Chung Chiang, Kaohsiung (TW); Chan-Hao Tseng, Tainan (TW)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 201 days.

(21) Appl. No.: 14/880,274

(22) Filed: Oct. 11, 2015

(65) Prior Publication Data

US 2016/0117018 A1 Apr. 28, 2016

(30) Foreign Application Priority Data

Oct. 21, 2014 (CN) .......................... 2014 1 0562097

(51) Int. Cl.
*G02F 1/1335* (2006.01)
*G06F 3/044* (2006.01)
*G06F 3/041* (2006.01)
*G02F 1/1333* (2006.01)

(52) U.S. Cl.
CPC ............ *G06F 3/044* (2013.01); *G06F 3/0412* (2013.01); *G06F 3/0416* (2013.01); *G02F 1/13338* (2013.01); *G02F 1/133528* (2013.01); *G06F 2203/04103* (2013.01); *G06F 2203/04112* (2013.01)

(58) Field of Classification Search
None
See application file for complete search history.

(56) References Cited

U.S. PATENT DOCUMENTS

2012/0026107 A1* 2/2012 Kim .................. G06F 3/044
345/173
2013/0147727 A1* 6/2013 Lee .................. G06F 3/0412
345/173

\* cited by examiner

*Primary Examiner* — Richard Kim
(74) *Attorney, Agent, or Firm* — Cooper Legal Group, LLC

(57) ABSTRACT

A touch device includes a cover plate, a carrying structure, a first sensor layer, a dielectric layer and a second sensor layer. The carrying structure is disposed on the cover plate and includes a film layer and a buffer layer stacked on each other. The film is located between the cover plate and the buffer layer. The first sensor layer is at least disposed on the carrying structure. The first sensor layer and the cover plate are respectively located at two opposite sides of the carrying structure. The dielectric layer is disposed on the first sensor layer. The dielectric layer and the carrying structure are respectively located at two opposite sides of the first sensor layer. The second sensor layer is at least disposed on the dielectric layer. The second sensor layer and the first sensor layer are respectively located at two opposite sides of the dielectric layer.

15 Claims, 13 Drawing Sheets

TOUCH DEVICE AND MANUFACTURING METHOD THEREOF

BACKGROUND OF THE DISCLOSURE

This Non-provisional application claims priority under 35 U.S.C. § 119(a) to Chinese Patent Application No. 201410562097.5 filed in the People's Republic of China on Oct. 21, 2014, the entire contents of which are hereby incorporated by reference.

FIELD OF THE DISCLOSURE

The present disclosure relates to touch devices and manufacturing methods thereof. In particular, it relates to touch devices with a lightweight and thin design, an excellent display effect and easy manufacturability, and manufacturing methods thereof.

DESCRIPTION OF THE RELATED ART

Currently, touch panels are popular as a display screen used in various electronics. Requirements on volume and weight of touch panels are tightening in response to a development trend toward lightweight and thin electronics. However, the objective of providing a lightweight and thin touch panel is achieved with difficulty because a relatively thick and heavy glass substrate frequently serves as a substrate for a sensing electrode of a conventional touch panel. In addition to the requirements on weight and thinness, display effect and durability are also important indicators of performance of the touch panel.

SUMMARY OF THE DISCLOSURE

The present disclosure provides a touch device with light weight, thin design, good display effect and durability.

According to the disclosure, a touch device includes a cover plate, a carrying structure, a first sensor layer, a dielectric layer and a second sensor layer. The carrying structure is disposed on the cover plate and includes a film layer and a buffer layer stacked on each other. The film layer is located between the cover plate and the buffer layer. The first sensor layer is at least disposed on the carrying structure. The first sensor layer and the cover plate are respectively located at two opposite sides of the carrying structure. The dielectric layer is disposed on the first sensor layer. The dielectric layer and the carrying structure are respectively located at two opposite sides of the first sensor layer. The second sensor layer is at least disposed on the dielectric layer. The second sensor layer and the first sensor layer are respectively located at two opposite sides of the dielectric layer.

In some embodiments, the touch panel further includes a protection layer. The protection layer is disposed on the second sensor layer. The protection layer and the dielectric layer are respectively located at two opposite sides of the second sensor layer.

In some embodiments, the touch device further includes a substrate. The substrate has polarity and is disposed on the protection layer. The substrate and the second sensor layer are respectively located at two opposite sides of the protection layer.

In some embodiments, the touch device further includes a liquid crystal module. The liquid crystal module includes a main body having liquid crystal molecules and a polarized layer. The polarized layer has polarity direction perpendicular to the substrate, and the polarized layer and the substrate are located at two opposite sides of the main body.

In some embodiments, the touch device further includes a mask layer disposed on the cover plate and between the cover plate and the carrying structure.

In some embodiments, the first sensor layer includes a plurality of first sensing electrodes and a plurality of first wires. The first sensing electrodes are spaced apart from each other on the carrying structure. The first wires are disposed on the carrying structure, having positions corresponding to the mask layer and are respectively connected to the first sensing electrodes. The second sensor layer includes a plurality of second sensing electrodes and a plurality of second wires. The second sensing electrodes are spaced apart from each other on the dielectric layer and have an extension direction different from that of the first sensing electrodes. The second wires are disposed on the dielectric layer, having positions corresponding to the mask layer, and are respectively connected to the second sensing electrodes.

In some embodiments, the dielectric layer has an area smaller that of the carrying structure. The second wires extend across the dielectric layer to the carrying structure.

In some embodiments, the first wires are uncovered by the dielectric layer.

In some embodiments, the dielectric layer is formed with a plurality of openings which are respectively corresponding to the first sensor layer. The first sensor layer includes a plurality of first sensing electrodes and a plurality of first wires. The first sensing electrodes spaced apart from each other on the carrying structure. The first wires are primarily disposed on the dielectric layer, have positions corresponding to the mask layer and extend through the openings to be respectively connected to the first sensing electrodes. The second sensor layer includes a plurality of second sensing electrodes and a plurality of second wires. The second sensing electrodes are spaced apart from each other on the dielectric layer and extends along in a direction different from that of the first sensing electrodes. The second wires are disposed on the dielectric layer, has positions corresponding to the mask layer and are respectively connected to the second sensing electrodes.

The present disclosure also provides a manufacturing method of the abovementioned touch device.

According to the disclosure, the manufacturing method of the disclosure includes: the step (A1) of providing a cover plate and a first substrate; the step (A2) of forming a carrying structure on the first substrate, the carrying structure including a film; the step (A3) of forming a plurality of the first sensing electrodes on the carrying structure, the first sensing electrodes and the cover plate being respectively located at two opposite sides of the carrying structure; the step (A4) of forming a dielectric layer on the first sensing electrodes, the dielectric layer and the film being respectively formed on two opposite sides of the first sensing electrodes; the step (A5) of forming a plurality of second sensing electrodes on the dielectric layer, the first sensing electrodes being respectively located at two opposite sides of the dielectric layer; the step (A6) of disposing a second substrate, the second substrate and the dielectric layer being respectively located at two opposite sides of the second sensing electrodes; and the step (A7) of removing the first substrate to form a structural assembly, the cover plate being laminated to the film of the structural assembly.

In some embodiments, the second substrate has polarity. The step (A1) further includes providing a liquid crystal module. The liquid crystal module includes a main body having liquid crystal molecules and a polarized layer. The polarized layer has polarity direction perpendicular to the second substrate. Posterior to the step (A7), the manufacturing method further comprises the step (B1) of connecting the liquid crystal module and the second substrate. The polarized layer and the second substrate are located at two opposite sides of the main body.

In some embodiments, the manufacturing method further includes the step (C1) of removing the second substrate step posterior to the step (A7).

In some embodiments, the manufacturing method further includes the step (D1) of forming a first adhesive layer on a portion of a surface of the first substrate between the steps (A1) and (A2), in the step (A2), the first adhesive layer being located between the film and the first substrate, the manufacturing method further comprising a step (D2) of cutting along a periphery of the first adhesive layer between the step (A6) and step (A7).

In some embodiments, the carrying structure further includes a buffer layer, in the step (A3), the first sensing electrodes being formed on the buffer layer, the first sensing electrodes and the film being respectively located at two opposite sides of the buffer layer.

In some embodiments, the manufacturing method further includes the step (E1) of forming a protection layer on the second sensing electrodes between the steps (A5) and (A6). The protection layer and the dielectric layer are respectively located at two opposite sides of the second sensing electrode. In the step (A6), the second substrate is dispose on the protection layer. The second substrate and the second sensing electrodes are respectively located at two opposite sides of the protection layer.

In some embodiments, the step (A1) of providing the cover plate further includes forming of a mask layer on the cover plate. In the step (A2), the mask layer is interposed between the cover plate and the film.

In some embodiments, the manufacturing method further includes: the step (F1) of forming a plurality of first wires on the carrying structure between the steps (A3) and (A4), the first wires being respectively connected to the first sensing electrodes and having positions corresponding to the mask layer, the first wires and the cover plate being respectively located at two opposite sides of the carrying structure; and the step (F2) of forming a plurality of second wires on the dielectric layer between the steps (A5) and (A6), the second wires being respectively connected to the second sensing electrodes and having positions corresponding to the mask layer, the second wires being at least disposed on the dielectric layer.

In some embodiments, the dielectric layer has an area smaller than that of the carrying structure. In the step (A5), the second wires extend across the dielectric layer to the carrying structure.

In some embodiments, in the step (A4), the first sensing electrodes are partially uncovered by the dielectric layer. The manufacturing method further comprises the step (G1) of forming a plurality of the first wires on the carrying structure between the steps (A5) and the step (A6), the first wires being respectively connected to the first sensing electrodes, having positions corresponding to the mask layer, and at least forming a plurality of second wires on the dielectric layer, the second wires being respectively connected to the second sensing electrodes and having positions corresponding to the mask layer.

In some embodiments, in the step (A4), the dielectric layer is formed with a plurality of openings with positions corresponding to the first sensing electrodes; and wherein the method further includes a step (H1) between the steps (A5) and (A6), a plurality of first wires and a plurality of second wires being formed on the dielectric layer, positions of the first wires having positions corresponding to the mask layer, the first wires extending through the openings to be respectively connected to the first sensing electrodes, positions of the second wires corresponding to the mask layer, the second wires being respectively connected to the second sensing electrodes.

With the supporting effect from the first substrate, the sensor layers are formed on the film. And then with the transferring effect of the second substrate, the film layer, along with the sensor layers formed thereon are attached to the cover plate. In this way, the film layer is thinner than the conventional substrate so as to achieve development of weight reduction and thinning of the touch device. Besides, by way of the arrangement of the buffer layer and the protection layer, the problems resulted from the stress and the visible electrode pattern of the touch device can be improved and protection effect is provided, so as to enhance the display effect and durability of the touch device.

BRIEF DESCRIPTION OF THE DRAWINGS

FIGS. 1 to 5 are top schematic views, illustrating various configurations of one embodiment of the touch device.

DETAILED DESCRIPTION OF THE DISCLOSURE

All illustrations of the drawings and exemplary embodiments are for the purpose of describing selected configurations of the disclosure, and are not intended to limit the scope of the disclosure. Moreover, in order to show the various elements clearly in the respective figures, illustrations thereof are for the purpose of demonstration or indication, and thus are not necessarily drawn to scale.

Figure 1:
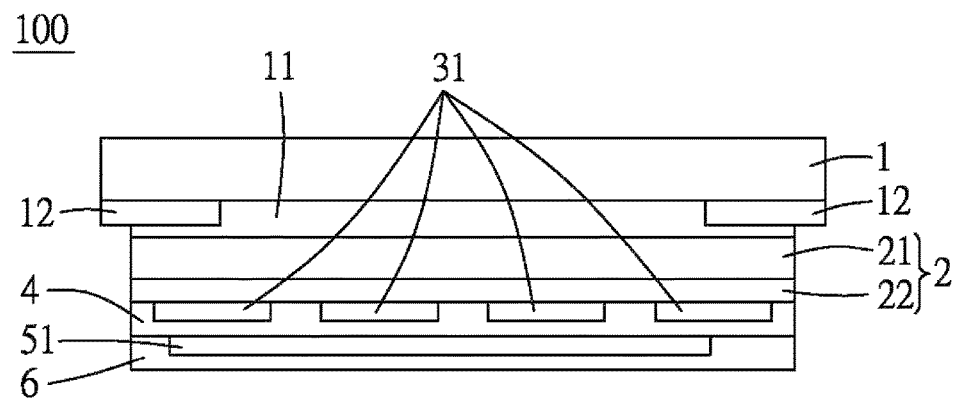
FIG. 1 is a side schematic view, illustrating one embodiment of a touch device according to the disclosure.
Figure 2:
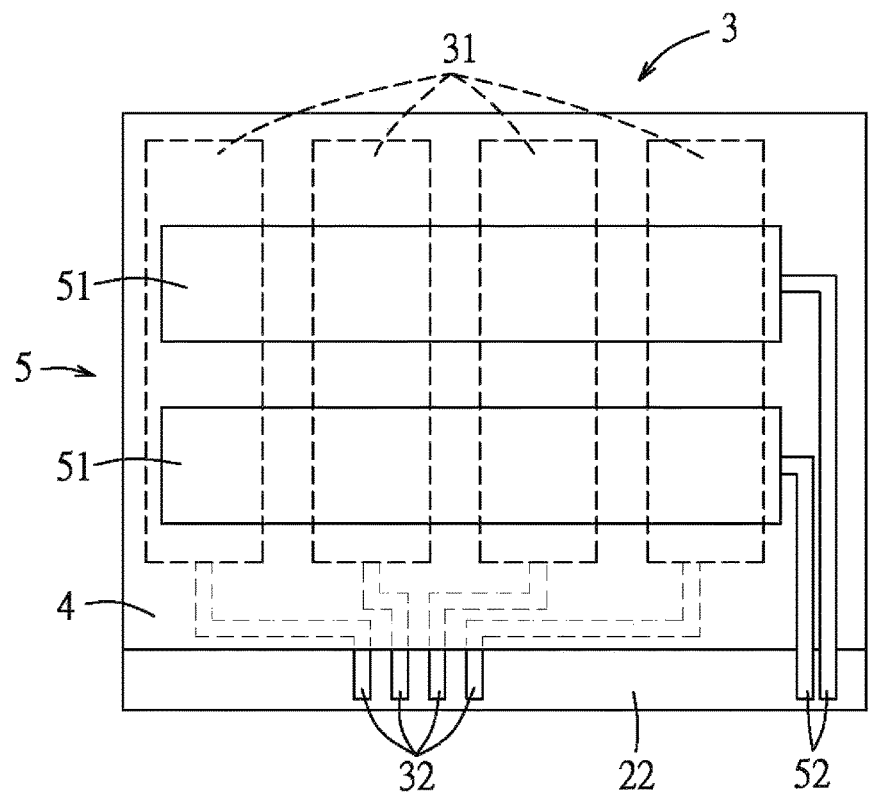

Please refer to FIGS. 1 and 2, which are directed to at least one embodiment of the disclosure. A touch device 100 may be applied to fabrication of various displays, such as liquid crystal displays or organic light emitting displays for providing a touch sensing function, but the application thereof is not limited to specific configurations.

Specifically, the touch device 100 of some embodiments includes a cover plate 1, an adhesive layer 11, a mask layer 12, a carrying structure 2, a first sensor layer 3 (see FIG. 2), a dielectric layer 4, a second sensor layer 5 (see FIG. 2) and a protection layer 6.

The cover plate 1 is a surface structure of the touch device 100, which may be made from a rigid or flexible material. In some embodiments, the cover plate 1 is made from a material selected from glass, sapphire, polyimide (PI), polypropylene (PP), Polystyrene (PS), acrylonitrile-butadiene-styrene (ABS), polyethylene terephthalate (PET), polyvinyl chloride (PVC), polycarbonate (PC), polyethylene (PE), polymethylmethacrylate (PMMA), polytetrafluoroethene (PTFE), or combinations thereof. In some embodiments, the cover plate 1 is further subjected to a reinforcing treatment to enhance structural strength of surfaces thereof. Besides, the surface of the cover plate 1 is the surface adapted to be touched by a user (see the top surface of the cover plate 1 shown in FIG. 1). The surface of the cover plate 1 may be configured to be a flat surface as shown in FIG. 1 or a curved surface if desired, without limitations of specific embodiments.

The adhesive layer 11 is disposed between the cover plate 1 and the carrying structure 2 for interconnection thereof. In some embodiments, the adhesive layer 11 is made from an optical clear adhesive (OCA). However, the adhesive layer 11 may be made from other transparent adhesive materials, without limitation to specific materials.

The mask layer 12 is disposed on the cover plate 1 and is located in a peripheral region of the cover plate 1 between the cover plate 1 and the carrying structure 2. In some embodiments, the mask layer 12 has a single-layered or multi-layered structure, which is made from a colored photoresist, colored ink, etc., for providing effects of appearance decoration and circuit-pattern masking.

The carrying structure 2 is laminated to the cover plate 1 by means of the adhesive layer 11 and includes a film layer 21 and a buffer layer 22 stacked on each other.

The film layer 21 is located between the cover plate 1 and the buffer layer 22. During fabrication of the touch device 100, the film layer 21 is provided as a supporting structure for the buffer layer 22, the first sensor layer 3, the dielectric layer 4, the second sensor layer 5 and the protection layer 6. The relevant manufacturing techniques are explained in the following paragraphs. In some embodiments, the film layer 21 is made from a material selected from polyimide (PI), polypropylene (PP), polystyrene (PS), acrylonitrile-butadiene-styrene (ABS), polyethylene terephthalate (PET), polyvinyl chloride (PVC), polycarbonate (PC), polyethylene (PE), polymethylmethacrylate (PMMA), polytetrafluoroethene, polyolefin, cyclic olefin polymers (COP), or combinations thereof. In some embodiments, the film layer 21 has a single-layered or multi-layered structure and is preferably made from polyimide (PI). The film layer 21 has a thickness that ranges from 0.1 μm to 15 μm, which is far less than that of a conventional glass substrate or flexible substrate. Therefore, weight reduction and thinning of the touch device 100 is achieved. The film layer 21 is suitable to be adhered to a flat or obliquely curved surface of the cover plate 1.

The buffer layer 22 is disposed on the film layer 21 and disposed between the film layer 21 and the first sensor layer 3. In some embodiments, the buffer layer 22 has a single-layered or multi-layered structure made from an inorganic material and/or an organic material. Preferably, the buffer layer 22 has a thickness ranging from 1 nm to 300 nm and a total thickness far less than that of the film layer 21. In some embodiments, the inorganic material suitable for making the buffer layer 22 is selected from titanium dioxide (TiO2), silica (SiO2), zirconia (ZrO2), tantalum oxide (Ta2O5), tungsten oxide (WO3), yttria (Y2O3), ceria (CeO2), antimony oxide (Sb2O3), niobium oxide (Nb2O5), boron oxide (B2O3), alumina (Al2O3), zinc oxide (ZnO), indium oxide (In2O3), cerium fluoride (CeF3), magnesium fluoride (MgF2), calcium fluoride (CaF2) or combinations thereof. In some embodiments, the inorganic material suitable for making the buffer layer 22 is selected from acrylic resin, polyimide (PI), polypropylene (PP), polystyrene (PS), acrylonitrile-butadiene-styrene copolymer (ABS), polyethylene terephthalate (PET), polyvinyl chloride (PVC), polycarbonate (PC), polyethylene (PE), polymethylmethacrylate (PMMA) or combinations thereof.

Regarding the structural properties of the buffer layer 22, the buffer layer 22 has a single-layered or multi-layered structural arrangement based on the selected abovementioned material so as to provide variety in effects in terms of properties such as reflectivity, coefficient of thermal expansion, mechanical performance, etc. As for reflectivity, in some embodiments, reflectivity values of the film layer 21, the buffer layer 22 and the first sensor layer 3 are arranged to have a relationship to be gradually increased in order and to be selected in response to the corresponding thicknesses thereof. The reflectivity of the first sensor layer 3 is greater than the reflectivity of the buffer layer 22, and the reflectivity of the buffer layer is 22 is greater than the reflectivity of the film layer 21. Such arrangement enhances light transmittance of the touch device 100 according to destructive interference of light and alleviates the problem of visible electrode patterns caused by the difference between an electrode-formed region and an electrode-free region of each the first and sensor layers 3, 5 in the light reflectivity. As for coefficient of thermal expansion, the coefficient of thermal expansion of the buffer layer 22 in some embodiments is between the coefficients of thermal expansion of the film layer 21 and the first sensor layer 3. Hence, when the temperature is changed, the structural stress is effectively reduced so as to be advantageous to a substrate release process carried out in the manufacture of the touch device 100 and to reduce the risk of damaging and destroying the film layer 21. As for the mechanical performance, the buffer layer 22 has a hardness greater than that of the film layer 21 and thus, the carrying structure 2 is made from the film layer 21 that has a relatively low hardness and a relatively good ductility and the film layer 21 in cooperation with the buffer layer 22 that has a relatively high hardness. This is advantageous to the substrate release process carried out in the manufacture of the touch device 100 and to enhance the entire structural strength of the carrying structure 2. However, in different embodiments, the arrangement of the buffer layer 22 in the carrying structure 2 can be omitted. That is to say, the carrying structure 2 only includes the film layer 21.

The first sensor layer 3 is at least disposed on the carrying structure 2. The first sensor layer 3 and the cover plate 1 are respectively located at two opposite sides of the carrying structure 2. The first sensor layer 3 is a patterned electrode layer and includes a plurality of first sensing electrodes 31 and a plurality of first wires 32 so as to provide a structural layer of the touch and sensing function.

The first sensing electrodes 31 are spaced apart from each other on the buffer layer 22. The first sensing electrodes 31 are made from a transparent conductive material selected from indium tin oxide (ITO), aluminum zinc oxide (AZO), zinc oxide (ZnO), antimony tin oxide (ATO), tin dioxide (SnO2), indium oxide (In2O3), a combination thereof or a conductive material selected from nano sliver, nano copper, carbon nanotubes, a metal mesh, or the like. In some embodiments, the first sensing electrodes 31 are strip-shaped, but the specific shape, number, size, and spacing thereof can be adjusted based on the intended application and are not limited to specific configurations.

The first wires 32 are disposed on the buffer layer 22 in positions corresponding to the mask layer 12 so as to be covered by the mask layer 12. The first wires 32 are respectively and correspondingly connected to the first sensing electrodes 31 so as to transmit a touch sensing signal produced by the first sensing electrodes 31 to an external circuit (not shown). In some embodiments, the first wires 32 are made from the same material as that of the first sensing electrodes 31 or made from a metallic material selected from gold, silver, copper, molybdenum, aluminum or alloys thereof, without limitation thereto.

The dielectric layer 4 is electrically insulating and is disposed on the first sensor layer 3. The dielectric layer 4 and the carrying structure 2 are respectively located at two opposite sides of the first sensor layer 3 so as to provide an electrically insulating function between the first sensor layer 3 and the second sensor layer 5. In some embodiments, the dielectric layer 4 is made from an electrically insulating transparent material, such as silicon or silica. The first wires 32 are not completely covered by the dielectric layer 4 so that the first wires 32 are connectable with other circuit structures, such as a flexible printed circuit board.

The second sensor layer 5 is primarily disposed on the dielectric layer 4. The second sensor layer 5 and the first sensor layer 3 are respectively located at two opposite sides of the dielectric layer 4. The second sensor layer 5 includes a plurality of second sensing electrodes 51 and a plurality of second wires 52 so as to provide a structural layer of the touch and sensing function likewise. The first sensing electrodes 31 cooperate with the second sensing electrodes 51 to achieve the touch and sensing function.

The second sensing electrodes 51 are spaced apart from each other on the dielectric layer 4 and have an extension direction different from that of the first sensing electrodes 31. In some embodiments, the second sensing electrodes 51 are made from a material similar to that of the first sensing electrodes 31. The material is selected from indium tin oxide (ITO), aluminum zinc oxide (AZO), zinc oxide (ZnO), antimony tin oxide (ATO), tin oxide (SnO2), indium oxide (In2O3), nano silver, nano copper, carbon nanotubes, a metal mesh, or the like. The second sensing electrodes 51 cooperate with the first sensing electrodes 31 to locate the touch and sensing position.

The second wires 52 have positions corresponding to the mask layer 12 and are primarily disposed on the dielectric layer 4. The second wires 52 extend across the dielectric layer 4 to the buffer layer 22. Each of the second wires 52 has one end connected to a corresponding one of the second sensing electrodes 51. In some embodiments, the second wires 52 are made from a material similar to that of the first wires 32 so as to transmit a touch sensing signal produced by the second sensing electrodes 51 to an external circuit (not shown).

The protection layer 6 is disposed on the second sensor layer 5. The protection layer 6 and the dielectric layer 4 are respectively located at two opposite sides of the second sensor layer 5 so as to reduce deterioration in the second sensor layer 5 caused by air, moisture and other harmful substances in the external environment and so as to provide a protection function. Specifically, in some embodiments, the protection layer 6 has a single-layered or multi-layered structure made from a material selected from titania (TiO2), silica (SiO2), zirconia (ZrO2) or an organic material. When the protection layer 6 has the multi-layered structure, the protection layer 6 can cooperate with the buffer layer 22 through arrangement of suitable reflectivity and thickness to further provide an effect to alleviate the problem of visible electrode circuit patterns of the first sensing electrodes 31 and the second sensing electrodes 51. However, in different embodiments, the arrangement of the protection layer 6 in the touch device 100 can be omitted and is not limited to the disclosure.

Referring to FIGS. 1, 3, 4 and 5, further configurations of the first sensor layer 3, the dielectric layer 4 and the second sensor layer 5 are shown in accordance with various embodiments. Except for the arrangement shown in FIG. 2, other alternative arrangements are applicable.

Figure 3:
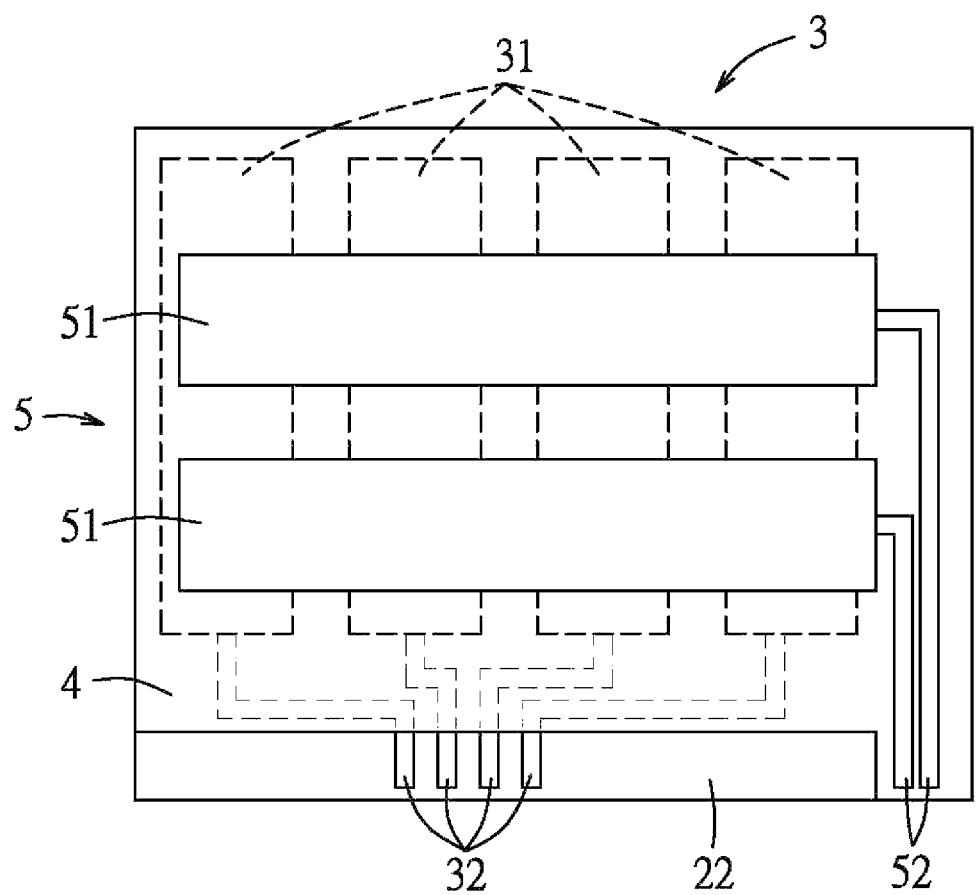

Referring to FIGS. 1 and 3, different from the configuration shown in FIG. 2, the dielectric layer 4 has a relatively large distribution area and the second wires 52 of the second sensor layer 5 are only disposed on the dielectric layer 4 without extending to the buffer layer 22. Hence, problems of wire breakage or circuit breakage due to drop height of the second wires 52 at the interface of the buffer layer 22 and the dielectric layer 4 can be avoided.

Figure 4:
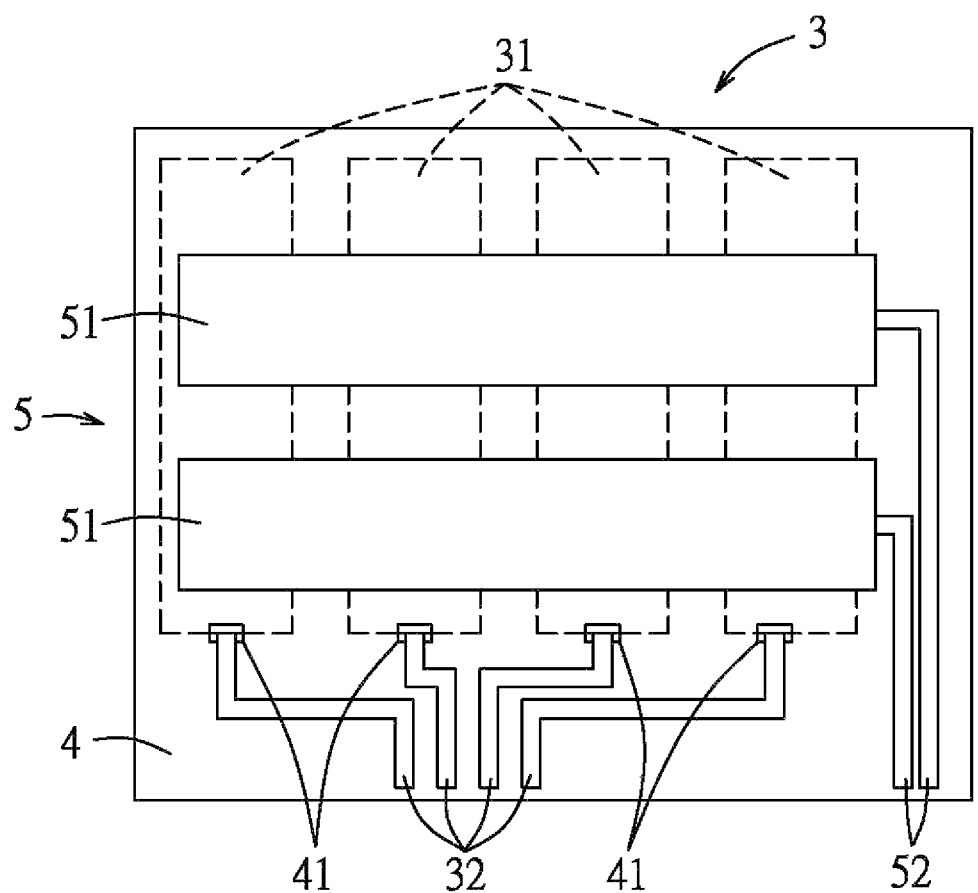

Referring to FIGS. 1 and 4, different from the configuration shown in FIG. 2, the dielectric layer 4 of some embodiments at least covers end portions of the first sensing electrodes 31. The dielectric layer 4 is formed with a plurality of openings 41 with positions respectively corresponding to the first sensing electrodes 31. The first wires 32 are primarily disposed on the dielectric layer 4 and respectively extend through the openings 41 to be respectively connected to the first sensing electrodes 31. Hence, in some embodiments, the first wires 32 and the second wires 52 are both located at the dielectric layer 4 so as to be simultaneously produced in the same processing step to simplify the manufacturing process.

Figure 5:
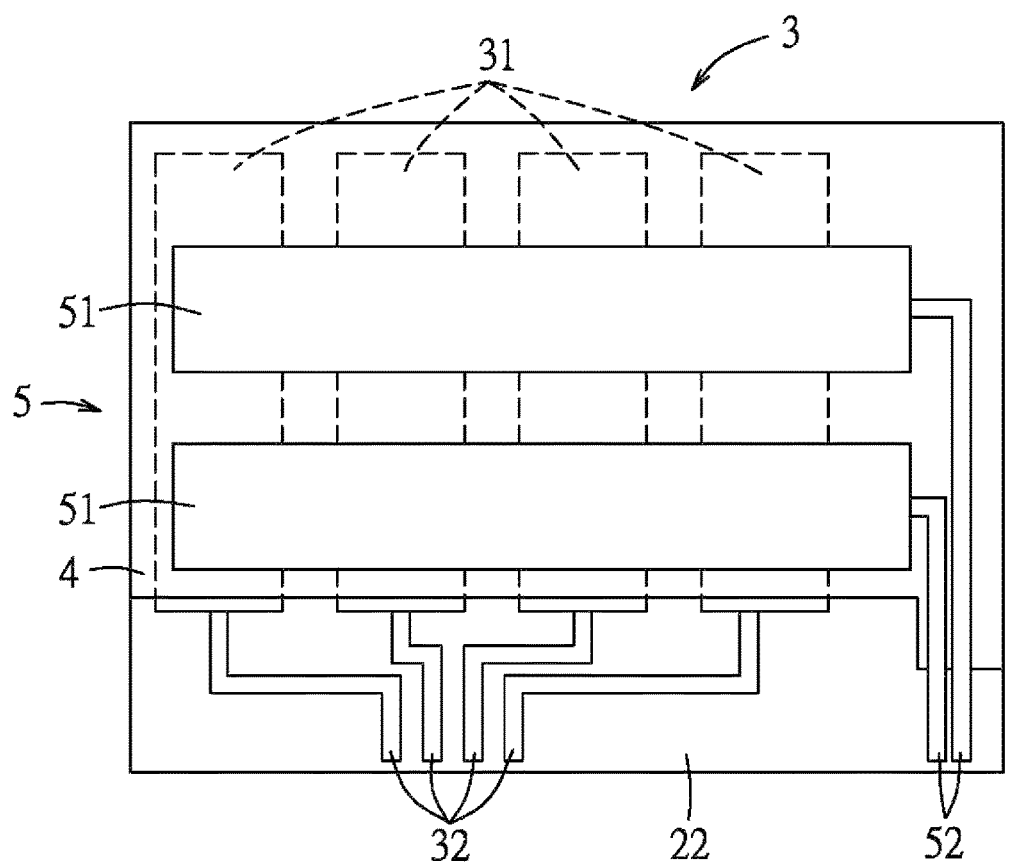

Referring to FIGS. 1 and 5, different from the configuration shown in FIG. 2, the dielectric layer 4 of some embodiments has a relatively small area so that the end portions of the first sensing electrodes 31 are not covered by the dielectric layer 4. The end portions of the first sensing electrodes 31 not covered by the dielectric layer 4 are respectively connected to the first wires 32, so that the first wires 32 and the second wires 52 can be simultaneously produced after manufacture of the second sensing electrodes 51 is completed so as to simplify the production process.

In view of the foregoing, the touch device 100 of some embodiments has various exemplified configurations and is not limited to specific structures.

Figure 6:
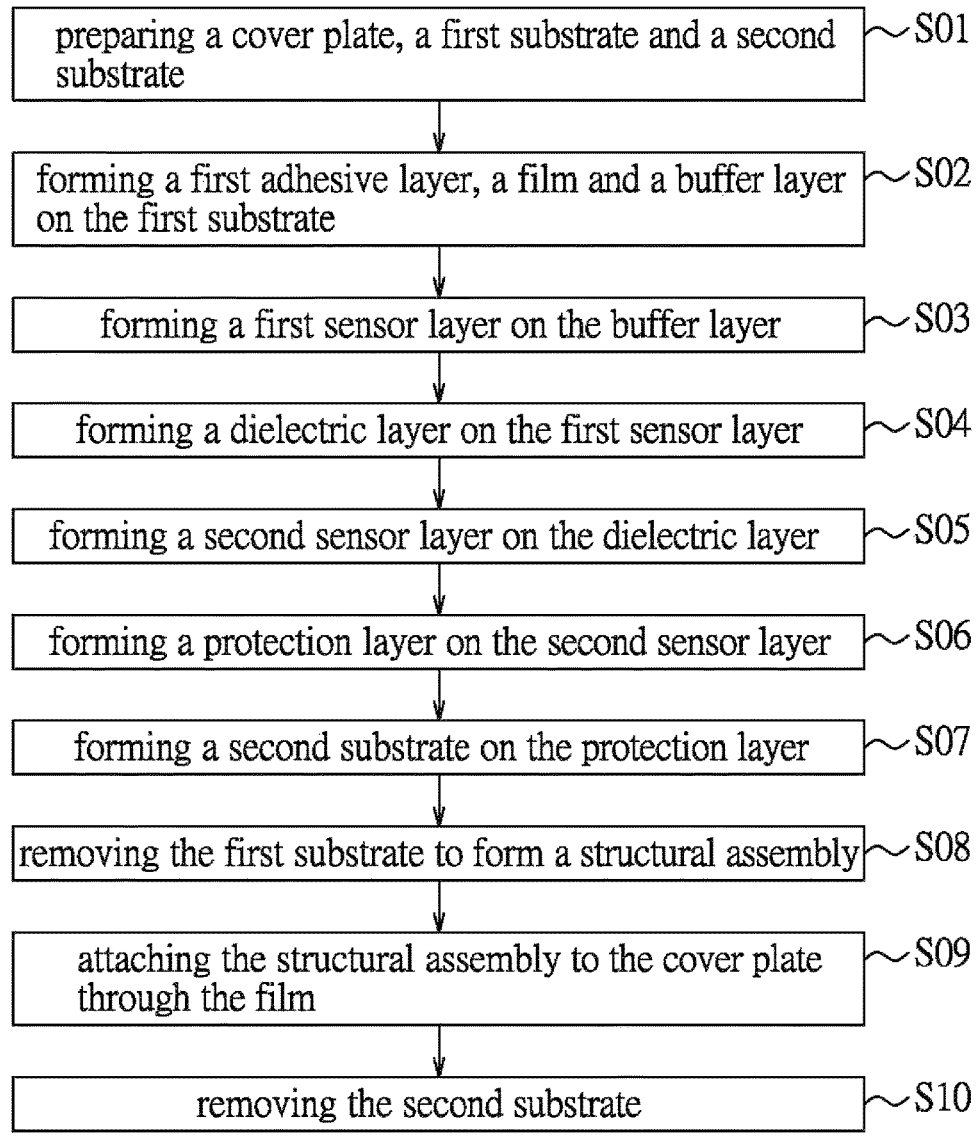
FIG. 6 is a flow chart, illustrating a manufacturing method of one embodiment of the touch device.

Referring to the flow chart of FIG. 6 and the schematic views of FIGS. 7 to 16, the manufacturing method of the touch device 100 is explained as follows.

In the step S01, a cover plate 1, a first substrate 71 and a second substrate 73 are prepared.

Regarding the manufacturing method of some embodiments, a substrate release technique is applied and thus, a portion of the structure described in the following is the finished structure of the touch device 100 and another portion of the structure is an intermediate structure during the manufacturing process. The cover plate 1 belongs to the finished structure of the touch device 100. Hence, the touch device 100 of some embodiments is made from a toughened glass material having an improved structural strength and has the mask layer 12 pre-formed from the colored photoresist and colored ink. The first substrate 71 and the second substrate 73 are not included in the finished structure of the touch device 100 and serve as carriers for providing a carrying function during the manufacture of the touch device 100. Hence, low-cost and recyclable transparent or opaque substrates, such as raw glass, etc., are used for making the first substrate 71 of some embodiments. On the other hand, in some embodiments, the temporary rigid or flexible substrate made from glass, polyethylene terephthalate (PET), cyclic olefin polymer (COP) or polypropylene(PP) is used for making the second substrate 73. However, the selected materials are not limited to those listed. It is noted that if the second substrate 73 is made by curing of a liquid material, the second substrate 73 can be made in the subsequent steps instead of step S01.

Figure 7:
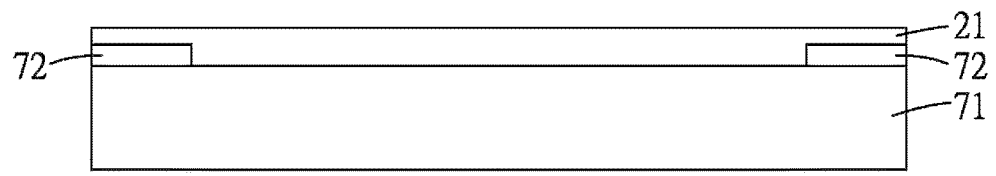
FIGS. 7 to 16 are schematic views of the manufacturing method of one embodiment of the touch device.
Figure 8:
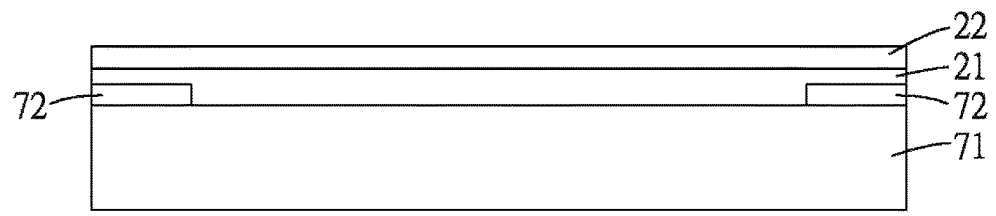
Figure 9:
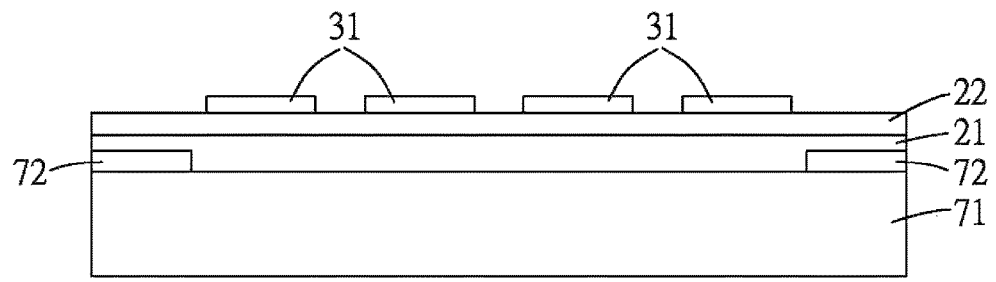

In the step S02, referring to FIGS. 1, 7 and 8, a first adhesive layer 72, a film layer 21 and a buffer layer 22 are sequentially formed on the first substrate 71.

The first adhesive layer 72 is formed on an outer edge portion of the first substrate 71 and belongs to the intermediate structure of the manufacturing process. In some embodiments, the first adhesive layer 72 is made using an adhesive promoter including organophilic functional groups and inorganophilic functional groups. By way of formation of the first adhesive layer 72 on the first substrate 71 through solution-coating and then curing, the first adhesive layer 72 and the first substrate 71 have a relatively strong adhesive strength therebetween so as to alleviate the problem of insufficient adhesive strength between the film layer 21 and the first substrate 71. Besides, difference in fitting strength among the first adhesive layer 72, the film layer 21 and the first substrate 71 is advantageous to the release process of the first substrate 71 in the subsequent steps. The relevant techniques are explained in the subsequent paragraphs. Besides, according to different configurations, in some embodiments, the first adhesive layer 72 is entirely disposed on the first substrate 71 or omitted, without limitation to the aforesaid.

In some embodiments, the film layer 21 is made from the abovementioned materials and is formed on the first substrate 71 through solution-coating and then baking. In some embodiments, the properties of the film layer 21 are modified by structural or compositional adjustment, copolymerization or blending.

In some embodiments, the buffer layer 22 is formed by physical vapor deposition, chemical vapor deposition, solution-coating and curing, printing or photolithography techniques so as to enhance carrying capacity of the carrying structure 2 and so as to be advantageous to the release process of the first substrate 71. It is noted that according to the desired application, in some embodiments, the formation of the buffer layer 22 is omitted in step S02.

In the step S03, referring to FIGS. 1, 2, 3 and 9, the first sensing electrodes 31 and the first wires 32 of the first sensor layer 3 are formed on the buffer layer 22 by sputtering and photolithography techniques or printing and spraying techniques, without limitation thereto.

Figure 10:
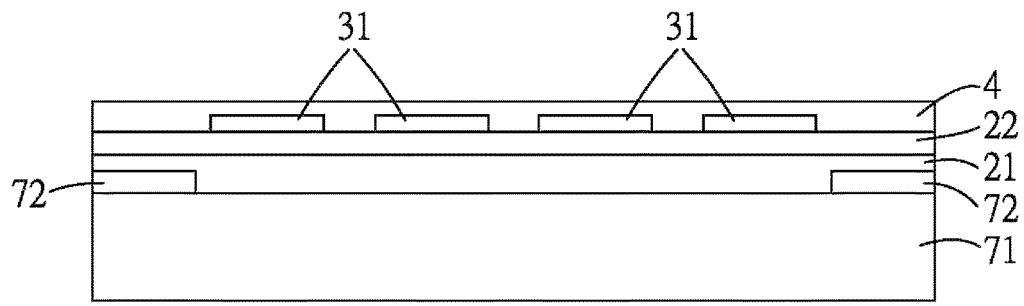
Figure 11:
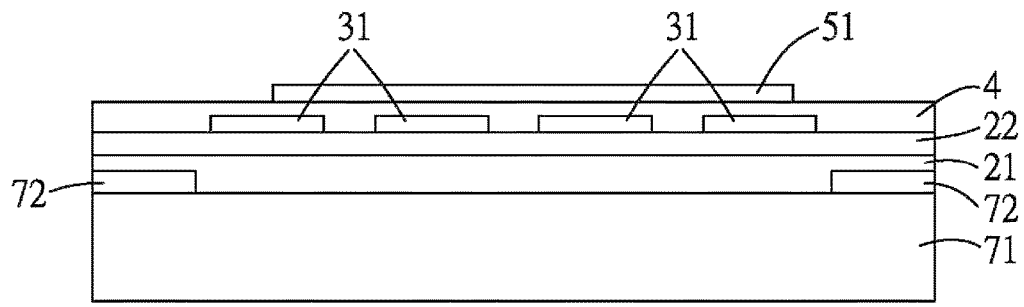

In the step S04, referring to FIGS. 1, 2 and 10, the dielectric layer 4 is formed on the first sensor layer 3 and the buffer layer 22 so that the dielectric layer 4 covers the first sensor layer 3 and the buffer layer 22. In some embodiments, the dielectric layer 4 is formed by physical vapor deposition, chemical vapor deposition, solution-coating and curing, printing or photolithography techniques, without limitation thereto.

In the step S05, referring to FIGS. 1, 2, 3 and 11, the second sensing electrodes 51 and the second wires 52 of the second sensor layer 5 are formed on the dielectric layer 4 in a manner similar to that of formation of the first sensing electrodes 31 and the first wires 32.

Figure 12:
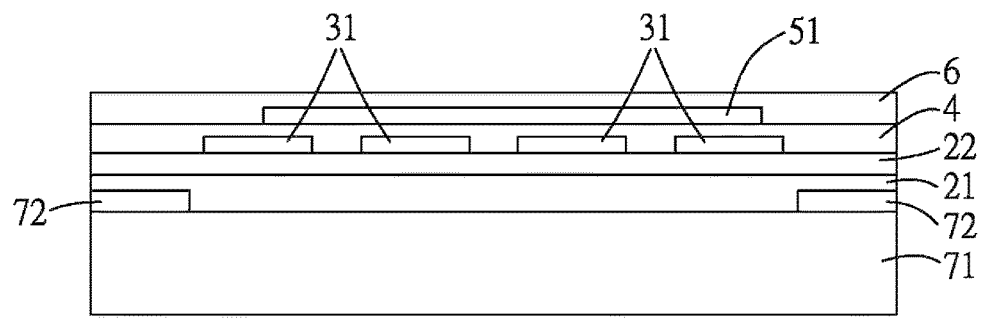

In the step S06, referring to FIGS. 1, 2 and 12, the protection layer 6 is formed on the second sensor layer 5. Specifically, in some embodiments, the protection layer 6 is formed by sputtering, chemical vapor deposition, ink jet printing, slit coating, spin coating, spraying or roller coating techniques, without limitation thereto. It is noted that according to the desired application, in some embodiments, the formation of the protection layer 6 is omitted in step S06.

Figure 13:
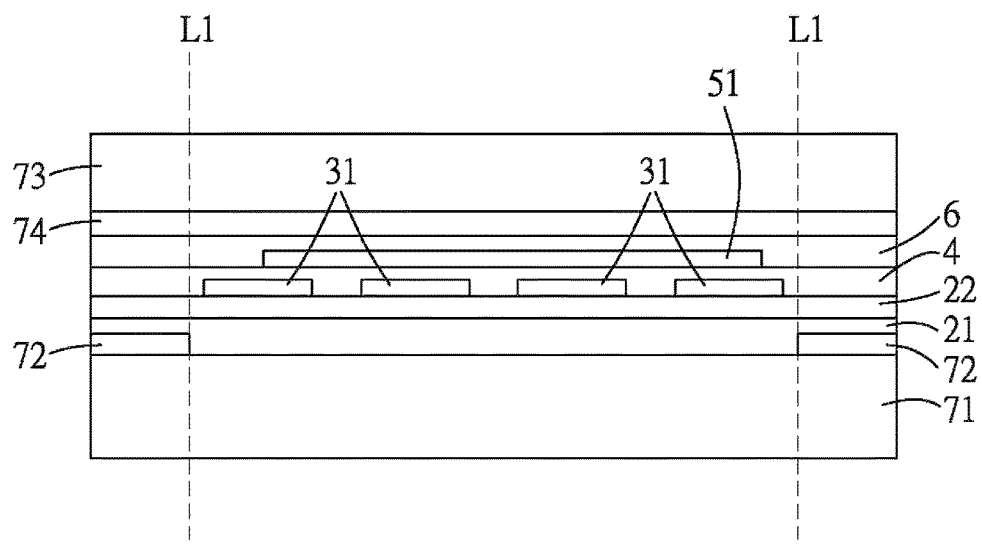

In the step S07, referring to FIGS. 1, 2 and 13, the second substrate 73 is formed on the protection layer 6. The second substrate 73 serves as another intermediate substrate after the first substrate 71 is removed. The second substrate 73 and the second sensor layer 5 are respectively located at two opposite sides of the protection layer 6.

When the second substrate 73 is prepared in advance in the step S01, the second substrate 73 may be temporarily attached to the protection layer 6 through the second adhesive layer 74. The second adhesive layer 74 is a removable adhesive that includes a non-water-soluble adhesive. In some embodiments, the removable adhesive includes a material that is adapted to attach two layers temporarily to each other and that is subsequently dissolved or removed in another manner. However, in different configurations, the second substrate 73 is directly formed on the protection layer 6 in terms of a liquid material without attachment through the second adhesive layer 74.

Figure 14:
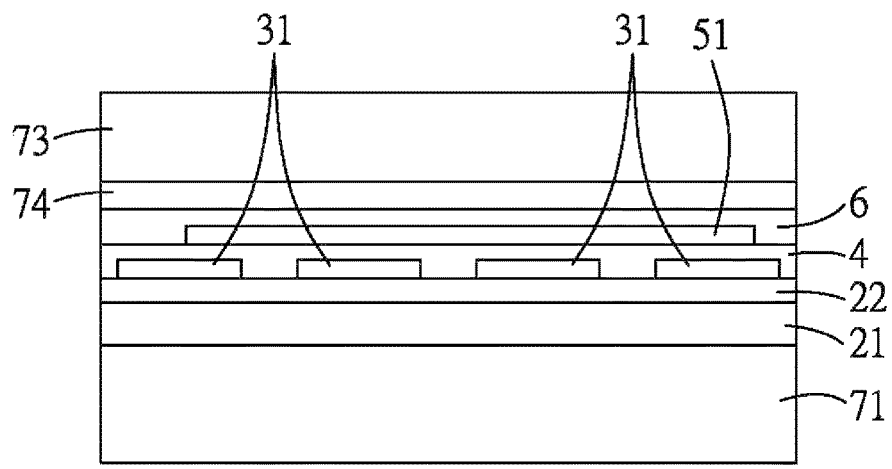

In the step S08, referring to FIGS. 1, 13 and 14, the first substrate 71 is removed so as to form a structural assembly. Specifically, a structural portion including the first adhesive layer 72 is cut off by cutting along a line marked with a periphery of the first adhesive layer 72 (see a line L1 shown in FIG. 13) so as to form the structure shown in FIG. 14. Alternatively, in other different configurations, the abovementioned cutting process can be controlled through an appropriate process control so as to perform the cutting process without damage to the first substrate 71 so that the first substrate 71 is recycled after the release treatment.

After the abovementioned cutting process, since there is no supplemental adherence between the film layer 21 and the first substrate 71 due to the presence of the first adhesive layer 72 of relatively high adherence, the first substrate 71 is easily removed from the film layer 21 by means of solution-soaking, heat treatment, cooling treatment, peeling with an external force or combinations thereof. For solution-soaking, the solution is selected from water, ethanol solution, propylene glycol monomethyl ether acetate (PGMEA) solution, or polyvinylidene fluoride (PVDF) in N-methyl-2-pyrrolidone (NMP) solution. On the other hand, the heat or cooling treatment is applied to the first substrate 71 to release the same by way of the difference in the coefficients of thermal expansion of the film layer 21 and the first substrate 71.

Figure 15:
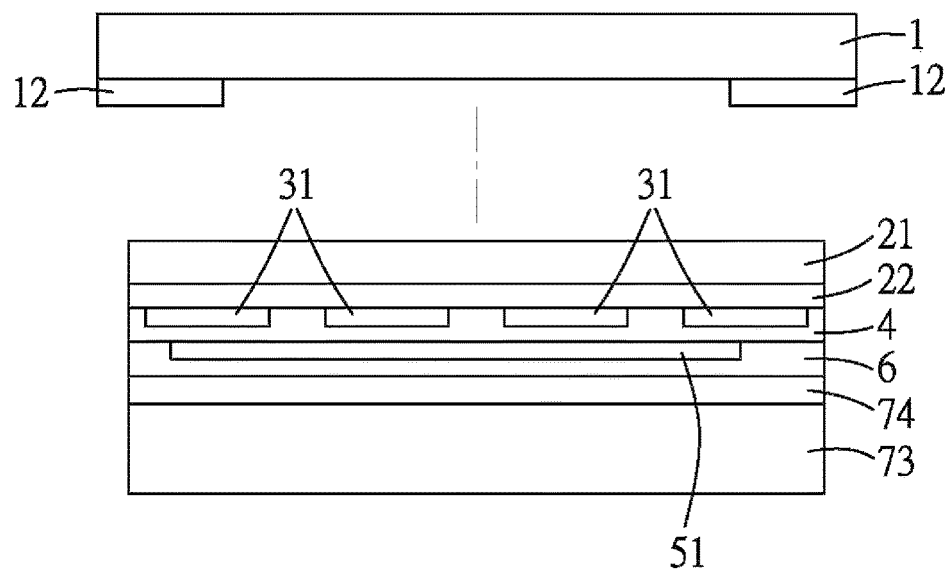
Figure 16:
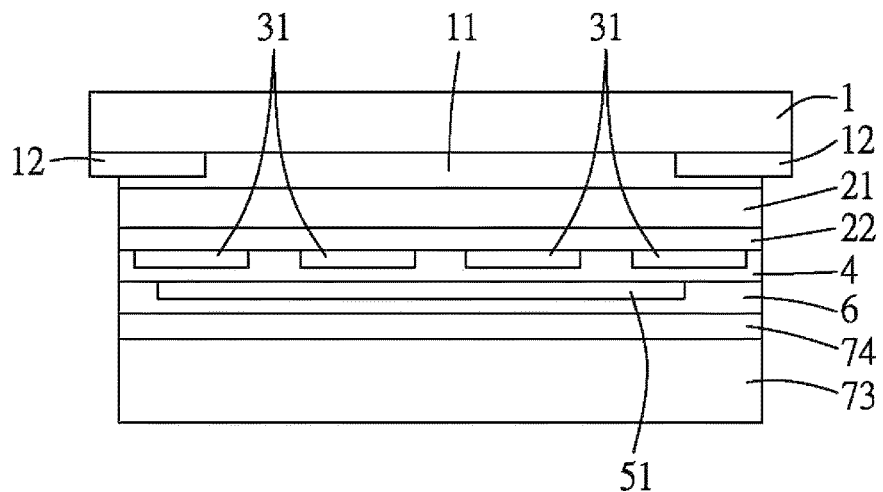

In the step S09, referring to FIGS. 1, 15 and 16, the cover plate 1 and the film layer 21 of the structural assembly formed in the step S08 are connected to each other through the adhesive layer 11 to form the structure shown in FIG. 16. The structural assembly includes the film layer 21, the buffer layer 22, the first sensing electrodes 31, the dielectric layer 4, the second sensing electrodes 51, the protection layer 6, the second substrate 73 and the second adhesive layer 74.

In the step S10, referring to FIGS. 1 and 16, the second substrate 73 and the second adhesive layer 74, are removed from the structure shown in FIG. 16 to complete the manufacture of the touch device 100 shown in FIG. 1. Specifically, this removing step includes light treatment, heat treatment, cooling treatment or combinations thereof. Besides, based on selection of the material for the second adhesive layer 74, the adherence between the second adhesive layer 74 and the second sensor layer 5 is reduced through ultraviolet (UV) radiation or the like. Consequently, the second substrate 73 can be easily removed. However, the abovementioned treatments are merely examples and should not be construed as limiting on the disclosure.

Besides, referring to FIGS. 1 and 4, the touch device of FIG. 4 is made by a manufacturing method different from that of the structures exemplified in FIGS. 2 and 3. Specifically, for the touch device 100 of FIG. 4, only the first sensing electrodes 31 are firstly formed in the step S03 for forming the first sensor layer 3. No first wires 32 are formed, and in the step S04 for forming the dielectric layer 4, the openings 41 are simultaneously formed. Therefore, in the step S05 for forming the second sensor layer 5, the first wires 32 and the second wires 52 are formed simultaneously in the same step. The first wires 32 extend through the openings 41 to be connected to the first sensing electrodes 31 so that the second wires 52 are directly formed on the dielectric layer 4 to simplify the manufacturing process.

Referring to FIGS. 1 and 5, the touch device 100 of FIG. 5 is made by a manufacturing method different from that of the structures exemplified in FIGS. 2, 3 and 4. Specifically, in the step S04 for forming the dielectric layer 4, the first sensing electrodes 31 are partially uncovered by the dielectric layer 4 so as to expose the end portions thereof. Therefore, in the step S05 for forming the second sensor layer 5, the first wires 32 and the second wires 52 are simultaneously formed on the buffer layer 22 and the dielectric layer 4 respectively so as to simplify the manufacturing process.

Consequently, in view of the aforesaid manufacturing process including the steps S01 to S10, the first substrate 71 and the second substrate 73 serve as the intermediate substrates during the manufacture of the touch device 100. It can reduce the thickness of the film layer 21 to the greatest degree that is served as the finished structure, so as to effectively reduce the thickness and weight of the touch device 100 and effectively enhance the manufacture yield. Besides, by way of the above manufacturing process, the manufacturing method in some embodiments is able to perform the manufacture of the touch devices 100 having various structures so as to achieve manufacture with variety in product form.

Figure 17:
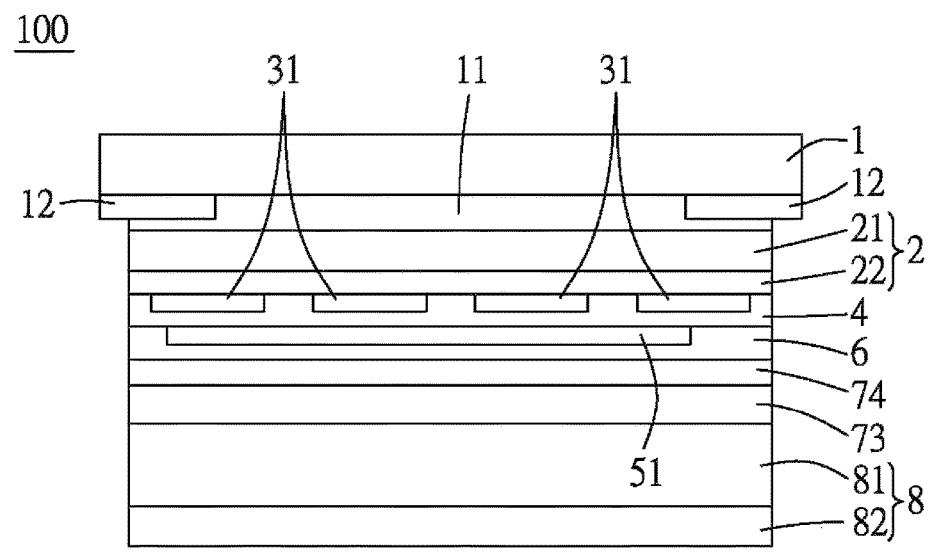
FIG. 17 is a side schematic view, illustrating one embodiment of a touch device according to the disclosure.

FIG. 17 is a diagram of a touch device 100 in accordance with other embodiments of the disclosure. Compared with the above configurations, the second substrate 73 of FIG. 17 is the finished structure of the touch device 100 and has no need to be subjected to the release process.

Additionally, the touch device 100 of FIG. 17 is provided to be applied to a liquid crystal display and thus, the second substrate 73 is formed to have polarity. The touch device 100 also has a liquid crystal module 8. The liquid crystal module 8 specifically includes a main body 81 having liquid crystal molecules and a polarized layer 82. The polarity direction of the polarized layer 82 is perpendicular to the substrate. The polarized layer 82 and the second substrate 73 are respectively located at two opposite sides of the main body 81. Therefore, the abovementioned second substrate 73 and the polarized layer 82 respectively serve as the upper and lower polarized sheets of the liquid crystal display.

Figure 18:
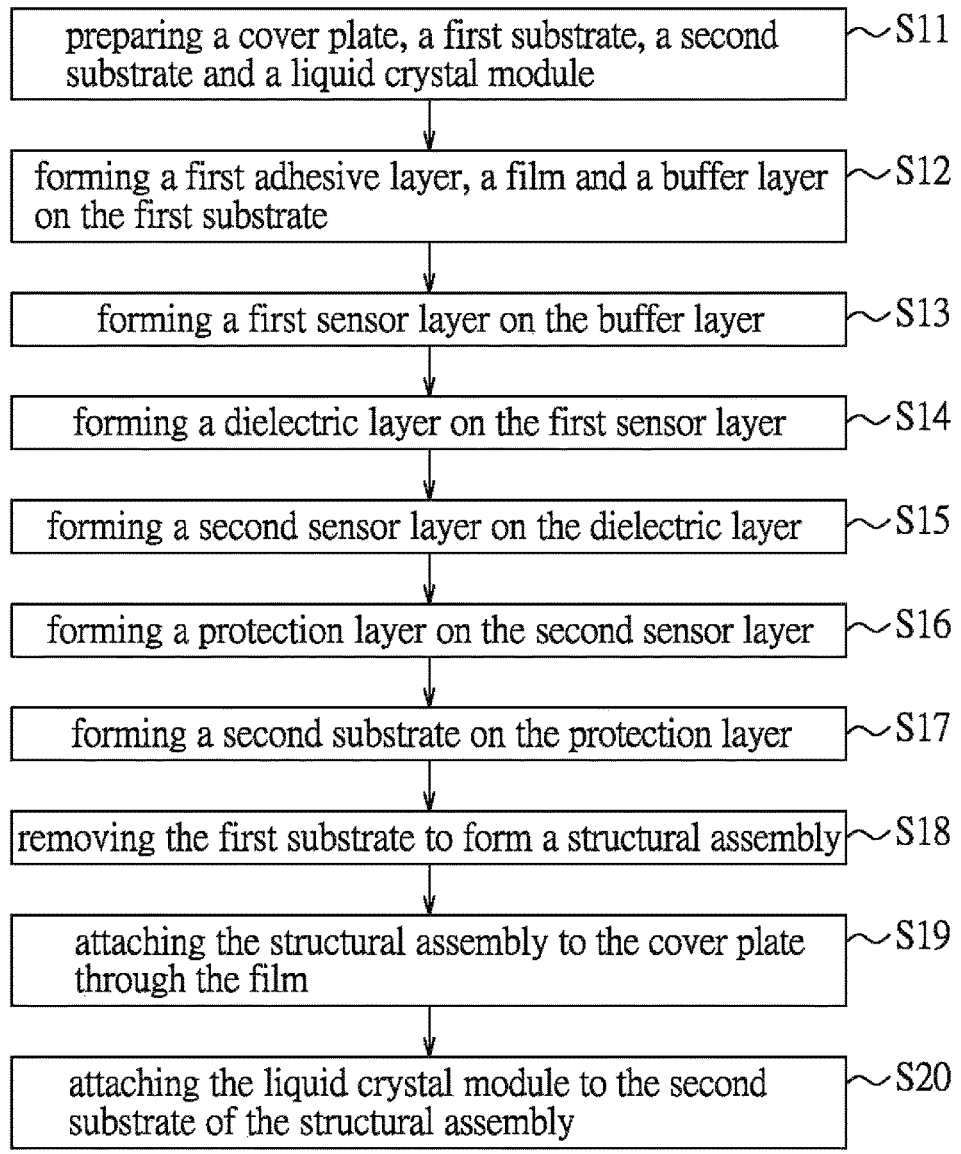
FIG. 18 is a flow chart, illustrating a manufacturing method of one embodiment of the touch device.

Referring to FIGS. 17 and 18, the manufacturing method of the touch panel of FIG. 17 is illustrated as follows.

Figure 19:
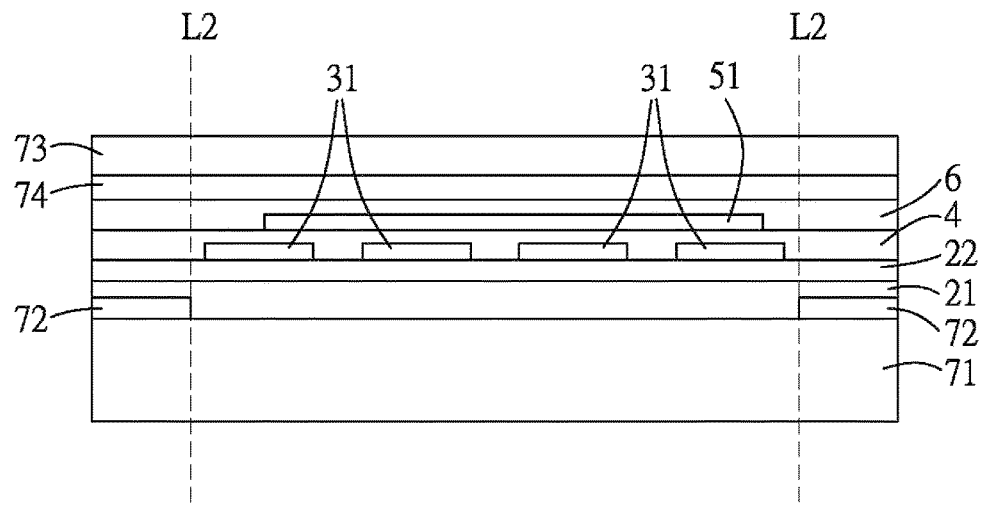
FIGS. 19 to 21 are schematic views of part of the manufacturing method of one embodiment of the touch device.
Figure 20:
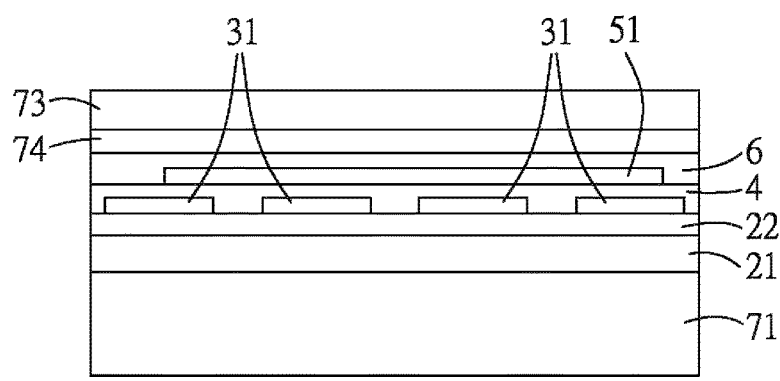

In the steps S11 to S18, referring to FIGS. 17, 19 and 20, these steps are similar to the steps S01 to S08 described above, and the detailed description thereof is omitted. However, it should be noted that in the step S11, the liquid crystal module 8 is provided in advance. In the step S17, the second substrate 73 having polarity can be formed into the polarized sheet in advance as illustrated in FIG. 19 and then is attached to the protection layer 6 through the second adhesive layer 74. Since the second substrate 73 is not required to be released or removed in the subsequent manufacturing process, the second adhesive layer 74 can be made from a material that is different from that of FIG. 1, such as an optical adhesive so as to enhance the adherence between the second substrate 73 and the protection layer 6. Besides, the second substrate 73 is not required to be prepared in advance, and is directly formed on the protection layer 6 through the step S17 of curing and polarization treatment of the liquid material. The cutting process is similar to that described above, being performed along the line L2 of the first adhesive layer 72 so as to remove the structure above the first adhesive layer 72 and so as to be advantageous to the release and removal of the first substrate 71.

Figure 21:
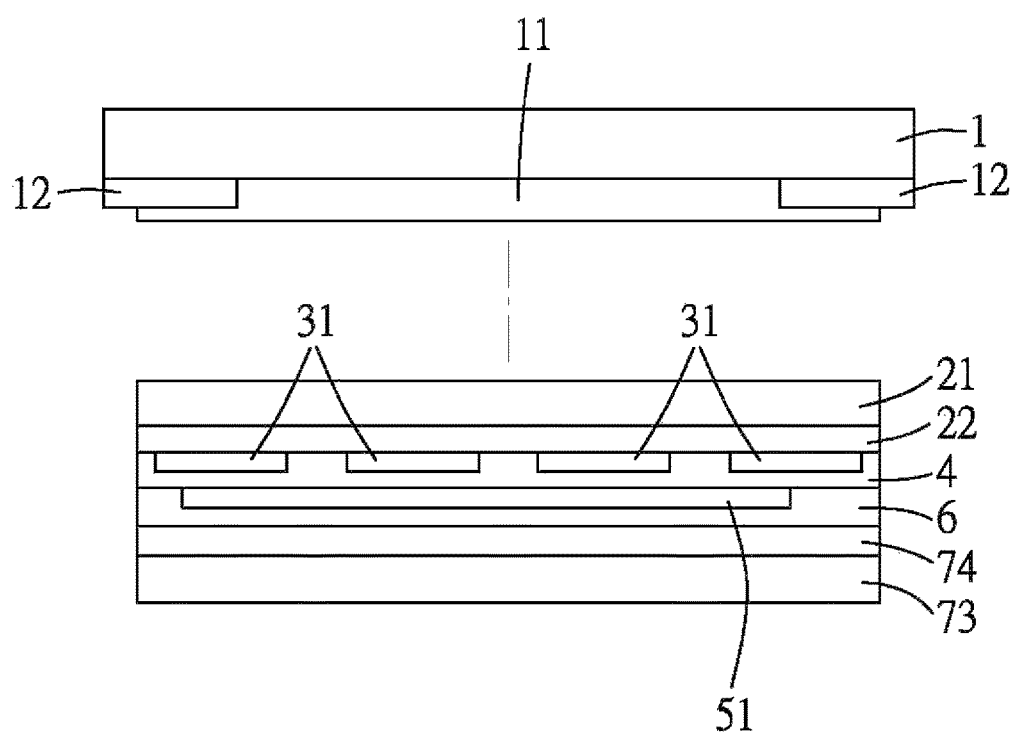

In the steps S19 and S20, referring to FIGS. 1, 20 and 21, the structural assembly of the first substrate 71 is removed. The film layer 21 of the structural assembly is attached to the cover plate 1 through the adhesive layer 11. Thereafter, the liquid crystal module 8 is attached to the second substrate 73 through the main body 81. The manufacture of the touch device 100 is completed and is adapted for the application relevant to the liquid crystal display.

The present disclosure has provided a touch device and the manufacturing method thereof. Via the supporting effect from the first substrate 71, the sensor layers are formed on the film layer 21. Next, by virtue of the transferring effect of the second substrate 73, the film layer 21 and the sensor layers formed on it are attached to a cover plate. In such a way, the film layer 21 is thinner than the conventional carrying substrate so as to achieve development of weight reduction and thinning of the touch device 100.

Besides, by way of the arrangement of the buffer layer 22 and the protection layer 6, the problems resulting from stress and the visible electrode pattern of the touch device 100 can be improved and protection effect is provided. Thus, the touch device 100 and the method of manufacturing the same are definitely able to achieve the objectives of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A manufacturing method of a touch device, comprising:
   step (A1), providing a cover plate and a first substrate;
   step (A2), forming a carrying structure on the first substrate, wherein the carrying structure includes a film;
   step (A3), forming a plurality of first sensing electrodes on the carrying structure, wherein the first sensing electrodes and the cover plate are respectively located at two opposite sides of the carrying structure;
   step (A4), forming a dielectric layer on the first sensing electrodes, wherein the dielectric layer and the film are respectively located at two opposite sides of the first sensing electrodes;
   step (A5), forming a plurality of second sensing electrodes on the dielectric layer, wherein the first sensing electrodes and the second sensing electrodes are respectively located at two opposite sides of the dielectric layer;
   step (A6), disposing a second substrate, wherein the second substrate and the dielectric layer are respectively located at two opposite sides of the second sensing electrodes; and
   step (A7), removing the first substrate to form a structural assembly, wherein:
      the cover plate is laminated to the film of the structural assembly, and
      the manufacturing method further comprises:

step (D1), forming a first adhesive layer on a portion of a surface of the first substrate between the steps (A1) and (A2), wherein in the step (A2), the first adhesive layer is located between the film and the first substrate; and step (D2), cutting along a periphery of the first adhesive layer between steps (A6) and (A7).

2. The manufacturing method of a touch device of claim 1, wherein:
the second substrate has polarity,
the step (A1) further includes providing a liquid crystal module,
the liquid crystal module includes a main body having liquid crystal molecules and a polarized layer,
the polarized layer has a polarity direction perpendicular to a polarity direction of the second substrate,
posterior to the step (A7), the manufacturing method further comprises step (B1), laminating the liquid crystal module and the second substrate, and
the polarized layer and the second substrate are respectively located at two opposite sides of the main body.

3. The manufacturing method of a touch device of claim 1, further comprising step (C1), removing the second substrate posterior to the step (A7).

4. The manufacturing method of a touch device of claim 1, wherein:
the carrying structure further includes a buffer layer,
in the step (A3), the first sensing electrodes is formed on the buffer layer, and
the first sensing electrodes and the film are respectively located at two opposite sides of the buffer layer.

5. The manufacturing method of a touch device of claim 1, further comprising step (E1), forming a protection layer on the second sensing electrodes between the steps (A5) and (A6), wherein:
the protection layer and the dielectric layer are respectively located at two opposite sides of the second sensing electrode,
in the step (A6), the second substrate is disposed on the protection layer, and
the second substrate and the second sensing electrodes are respectively located at two opposite sides of the protection layer.

6. The manufacturing method of a touch device of claim 1, wherein:
the step (A1) of providing the cover plate further includes forming a mask layer on the cover plate, and
in the step (A2), the mask layer is located between the cover plate and the film.

7. The manufacturing method of a touch device of claim 6, further comprising:
step (F1), forming a plurality of first wires on the carrying structure between the steps (A3) and (A4), wherein:
the first wires are respectively connected to the first sensing electrodes and have positions corresponding to the mask layer, and
the first wires and the cover plate are respectively located at two opposite sides of the carrying structure; and
step (F2), forming a plurality of second wires on the dielectric layer between the steps (A5) and (A6), wherein the second wires are respectively connected to the second sensing electrodes and have positions corresponding to the mask layer.

8. The manufacturing method of a touch device of claim 7, wherein:

the dielectric layer has an area smaller than that of the carrying structure, and
in the step (A5), the second wires extend across the dielectric layer to the carrying structure.

9. The manufacturing method of a touch device of claim 6, wherein:
in the step (A4), the first sensing electrodes are partially uncovered by the dielectric layer,
the manufacturing method further comprises the step (G1), forming a plurality of first wires on the carrying structure between the steps (A5) and (A6), wherein the first wires are respectively connected to the first sensing electrodes and have positions corresponding to the mask layer, and forming a plurality of second wires on the dielectric layer, wherein the second wires are respectively connected to the second sensing electrodes and have positions corresponding to the mask layer.

10. The manufacturing method of a touch device of claim 6, wherein:
in the step (A4), the dielectric layer is formed with a plurality of openings with positions corresponding to the first sensing electrodes,
the manufacturing method further comprises step (H1), forming a plurality of first wires and a plurality of second wires on the dielectric layer between the steps (A5) and (A6),
positions of the first wires correspond to the mask layer,
the first wires extend through the openings to be respectively connected to the first sensing electrodes,
positions of the second wires correspond to the mask layer, and
the second wires are respectively connected to the second sensing electrodes.

11. A manufacturing method of a touch device, comprising:
step (A1), providing a cover plate and a first substrate, wherein the cover plate includes a mask layer;
step (A2), forming a carrying structure on the first substrate, wherein:
the carrying structure includes a film, and
the mask layer is located between the cover plate and the film;
step (A3), forming a plurality of first sensing electrodes on the carrying structure, wherein the first sensing electrodes and the cover plate are respectively located at two opposite sides of the carrying structure;
step (A4), forming a dielectric layer on the first sensing electrodes, wherein:
the dielectric layer is formed with a plurality of openings with positions corresponding to the first sensing electrodes, and
the dielectric layer and the film are respectively located at two opposite sides of the first sensing electrodes;
step (A5), forming a plurality of second sensing electrodes on the dielectric layer, wherein the first sensing electrodes and the second sensing electrodes are respectively located at two opposite sides of the dielectric layer;
step (A6), disposing a second substrate, wherein the second substrate and the dielectric layer are respectively located at two opposite sides of the second sensing electrodes; and
step (A7), removing the first substrate to form a structural assembly, wherein:
the cover plate is laminated to the film of the structural assembly, and
the manufacturing method further comprises:

step (H1), forming a plurality of first wires and a plurality of second wires on the dielectric layer between the steps (A5) and (A6), wherein:
  positions of the first wires correspond to the mask layer,
  the first wires extend through the openings to be respectively connected to the first sensing electrodes,
  positions of the second wires correspond to the mask layer, and
  the second wires are respectively connected to the second sensing electrodes.

12. The manufacturing method of a touch device of claim 11, wherein:
  the second substrate has polarity,
  the step (A1) further includes providing a liquid crystal module,
  the liquid crystal module includes a main body having liquid crystal molecules and a polarized layer,
  the polarized layer has a polarity direction perpendicular to a polarity direction of the second substrate,
  posterior to the step (A7), the manufacturing method further comprises step (B1), laminating the liquid crystal module and the second substrate, and
  the polarized layer and the second substrate are respectively located at two opposite sides of the main body.

13. The manufacturing method of a touch device of claim 11, further comprising step (C1), removing the second substrate posterior to the step (A7).

14. The manufacturing method of a touch device of claim 11, wherein:
  the carrying structure further includes a buffer layer,
  in the step (A3), the first sensing electrodes is formed on the buffer layer, and
  the first sensing electrodes and the film are respectively located at two opposite sides of the buffer layer.

15. The manufacturing method of a touch device of claim 11, further comprising step (E1), forming a protection layer on the second sensing electrodes between the steps (A5) and (A6), wherein:
  the protection layer and the dielectric layer are respectively located at two opposite sides of the second sensing electrode,
  in the step (A6), the second substrate is disposed on the protection layer, and
  the second substrate and the second sensing electrodes are respectively located at two opposite sides of the protection layer.

* * * * *